(12) United States Patent
Trapp et al.

(10) Patent No.: US 7,490,750 B2
(45) Date of Patent: Feb. 17, 2009

(54) METHOD AND APPARATUS FOR LOCALLY CLAMPING COMPONENTS THAT ARE TO BE JOINED BY FRICTION STIR WELDING

(75) Inventors: Timothy J Trapp, Columbus, OH (US); Timothy V Stotler, Columbus, OH (US)

(73) Assignee: Edison Welding Institute, Columbus, OH (US)

( * ) Notice: Subject to any disclaimer, the term of this patent is extended or adjusted under 35 U.S.C. 154(b) by 398 days.

(21) Appl. No.: 10/543,244

(22) PCT Filed: Apr. 9, 2004

(86) PCT No.: PCT/US2004/011149

§ 371 (c)(1),
(2), (4) Date: Jul. 25, 2005

(87) PCT Pub. No.: WO2004/091839

PCT Pub. Date: Oct. 28, 2004

(65) Prior Publication Data

US 2006/0102689 A1    May 18, 2006

Related U.S. Application Data

(60) Provisional application No. 60/462,007, filed on Apr. 11, 2003.

(51) Int. Cl.
*B23K 20/12* (2006.01)
(52) U.S. Cl. .............. 228/2.1; 228/112.1; 156/580
(58) Field of Classification Search ............. 156/580.1, 156/73.1, 73.5; 228/212, 30, 212.1, 2.1; 76/108.1
See application file for complete search history.

(56) References Cited

U.S. PATENT DOCUMENTS

| | | | |
|---|---|---|---|
| 3,705,701 A * | 12/1972 | Hunt | 248/544 |
| 5,460,317 A | 10/1995 | Thomas | |
| 5,971,247 A * | 10/1999 | Gentry | 228/2.1 |
| 6,070,784 A | 6/2000 | Holt | |
| 6,237,829 B1 | 5/2001 | Aota | |
| 6,302,315 B1 | 10/2001 | Thompson | |
| 6,450,395 B1 | 9/2002 | Weeks et al. | |
| 6,516,992 B1 * | 2/2003 | Colligan | 228/112.1 |
| 6,554,175 B1 * | 4/2003 | Thompson | 228/112.1 |
| 6,585,148 B2 * | 7/2003 | Aono et al. | 228/112.1 |
| 6,595,403 B2 | 7/2003 | Okamura | |
| 6,604,667 B2 | 8/2003 | Schilling et al. | |

\* cited by examiner

*Primary Examiner*—Kiley Stoner
*Assistant Examiner*—Erin B Saad
(74) *Attorney, Agent, or Firm*—David J. Dawsey; Michael J. Gallagher; Gallagher & Dawsey Co. LPA (57) ABSTRACT

The apparatus (50) includes a friction stir welding tool (100), a local clamping means (200), and an interface (300) that joins the tool (100) and the local clamping means (200). The local clamping means (200) is in close proximity to the at least one sidewall (130) of the tool (100) and has a housing (210) and a plurality of contact devices (220). The local clamping means (200) transfers a clamping force to the first and the second components (C1, C2) and holds them firmly in place during welding. The local clamping means (200) includes a plurality of contact devices (220) that may take the form of casters, rollers (222), and ball bearings (224). The location of the contact devices (220) is significant as external clamping is greatly reduced, and often eliminated, as the contact devices (220) are brought into close proximity to the area of the weld.

12 Claims, 14 Drawing Sheets

FIG. 1 (PRIOR ART)

(PRIOR ART)

METHOD AND APPARATUS FOR LOCALLY CLAMPING COMPONENTS THAT ARE TO BE JOINED BY FRICTION STIR WELDING

RELATED APPLICATIONS

This application claims the benefit of U.S. provisional patent application Ser. No. 60/462,007, filed Apr. 11, 2003, all of which is incorporated by reference as if completely written herein.

STATEMENT REGARDING FEDERALLY SPONSORED RESEARCH OR DEVELOPMENT

This invention was not made as part of a federally sponsored research or development project.

TECHNICAL FIELD

The present invention relates to the field of friction stir welding; particularly, to a method and apparatus for locally clamping components that are to be joined by friction stir welding.

BACKGROUND OF THE INVENTION

Those in the wide ranging materials joining industries have recognized the benefits of friction stir welding (FSW) since its invention, only to be precluded from widespread application due to a number of factors. One such long-recognized need has been that of providing a simple, reliable, and inexpensive joint clamping mechanism that provides manufacturing flexibility and overcomes the limitations of current clamping systems.

FSW is a relatively simple method of solid phase welding developed by The Welding Institute in the early 1990's. The process utilizes a specially shaped nonconsumable cylindrical tool with a profiled probe, often threaded, extending from a shoulder of the tool that is rotated and plunged into a joint formed by abutting edges of the workpieces that are to be joined until a surface of the shoulder contacts the surface of the workpieces. The rotating tool plasticizes a region of the workpieces around the probe and beneath the shoulder. The tool is then advanced along the joint. The rotation of the tool develops frictional heating of the workpieces and the tool forces plasticized workpiece material from the leading edge of the tool to the rear of the tool, while confining the plasticized material from above by the shoulder, where it consolidates and cools to form a high quality weld.

The FSW tool is generally formed as a cylindrical piece with a shoulder face that meets a probe that projects from the shoulder face at a right angle, as illustrated in U.S. Pat. Nos. 5,460,317 and 6,029,879. In some instances, the probe actually moves in a perpendicular direction in an aperture formed in the face of the shoulder, as illustrated in U.S. Pat. Nos. 5,611,469, 5,697,544, and 6,053,391. The face of the shoulder may be formed with an upward dome that is perpendicular to the probe, as illustrated in U.S. Pat. Nos. 5,611,479, 5,697, 544, and 6,053,391. The dome region and an unobstructed shoulder face to probe interface are considered essential for the proper frictional heating of the workpiece material. The dome region serves to constrain plasticized material for consolidation at the trailing edge of the FSW tool so as to prevent it from extruding out from under the sides of the tool.

Since FSW is a solid-state process, meaning there is no melting of the materials, many of the problems associated with other fusion welding methods are avoided, including porosity, solidification cracking, shrinkage, and weld pool positioning and control. Additionally, FSW minimizes distortion and residual stresses. Further, since filler materials are not used in FSW, issues associated with chemical segregation are avoided. Still further, FSW has enabled the welding of a wide range of alloys that were previously unweldable. Yet another advantage of FSW is that it does not have many of the hazards associated with other welding means such as welding fumes, radiation, high voltage, liquid metals, or arcing. Additionally, FSW generally has only three process variables to control (rotation speed, travel speed, and pressure), whereas fusion welding often has at least twice the number of process variables (purge gas, voltage, amperage, wire feed speed, travel speed, shield gas, arc gap, just to name a few). Perhaps most importantly, the crushing, stirring, and forging of the plasticized material by the FSW tool produces a weld that is more reliable than conventional welds and maintains material properties more closely to those of the workpiece properties, often resulting in twice the fatigue resistance found in fusion welds.

Despite all the advantages of FSW it has only found very limited commercial application to date due to many difficulties associated therewith, including both the machine cost as well as the tooling cost. Machine cost refers to the cost of the actual FSW apparatus, whereas tooling costs refers to the actual tooling components as well as the clamps and related support structure, or backing framework. Perhaps the greatest difficulty to date has been associated with securely clamping the workpieces during the welding process. Typically, when the workpieces edges are abutted to create a joint, the workpieces must be rigidly clamped to a backing bar in a manner that prevents the joint from being forced apart as the probe is plunged into the joint. The tool is generally forced into the workpieces at loads exceeding 500 pounds of force, while rotating at hundreds of revolutions per minute. As a result, in even the simplest joining procedures elaborate clamping systems are used in which a plurality of clamps is installed over the entire length of each workpiece. Such clamping is extremely time consuming to set-up and the required hardware is expensive. As a result, FSW has been limited to welds of simple travel paths on relatively simple components thereby preventing widespread use of FSW, and particularly FSW on components having complex curvature.

Prior FSW systems have utilized a plurality of rollers rigidly secured to the FSW apparatus to limit the depth that the probe may enter the workpieces, as perhaps best illustrated in U.S. Pat. No. 5,971,247. The prior art rollers have generally been large and heavy, often having four or more rollers on each workpiece, and are located away from the weld area. Such rollers systems have generally only been practical in flat table FSW setups wherein flat workpiece sheets are clamped to a flat table and are then subjected to the FSW apparatus and clamping rollers.

The instant invention addresses many of the shortcomings of the prior art and allows for previously unavailable benefits. A method and apparatus for local clamping during the FSW process has long been needed. The system of the present invention is designed to overcome the clamping limitations of FSW. The system of the present invention does not introduce limitations into the FSW process and opens up the application of FSW to a wide variety of applications which were previously uneconomical. The method and apparatus utilize clamping means in the immediate vicinity of the FSW tool thereby reducing, if not eliminating, much of the traditional heavy clamping required in conventional FSW, and further improving access to the weld joint, improving weld quality, and significantly reducing manufacturing set-up time and tooling costs. The instant invention also can adapt to workpieces of complex curvature, incorporate the use of multi-axis computer control systems, as well as provide an adaptive load control system.

SUMMARY OF INVENTION

In its most general configuration, the present invention advances the state of the art with a variety of new capabilities and overcomes many of the shortcomings of prior methods in new and novel ways. In its most general sense, the present invention overcomes the shortcomings and limitations of the prior art in any of a number of generally effective configurations.

In one of the many preferable configurations, the present invention is designed to locally clamp a number of components together during friction stir welding (FSW). The apparatus includes a FSW tool, a local clamping means, and an interface that joins the FSW tool and the local clamping means. The FSW tool is formed with at least one sidewall and a probe. The FSW tool is exposed to a minimum of two nonrotational forces during welding, regardless of the motion control system; a travel force and a compressive force. The travel force is simply the force, or forces, that route the tool along the joint to be welded and force the tool through the components. The compressive force is that force, or forces, exerted on the tool to force the probe into the components and maintain the probe in the components during welding.

The local clamping means is in close proximity to the tool sidewall and has a housing and a plurality of contact devices. The contact devices transfer a clamping force to the components to hold them firmly in place during FSW, thereby resisting their tendency to separate from one another as the tool is forced between them. The apparatus may also include a load control system to independently and adaptively control and apply the compressive force and the clamping force, in addition to the travel force, or forces. The interface permits the compression force and the clamping force to be entirely independent, or one in the same. The interface also permits the apparatus to be "steered" along complex nonlinear joints on complex surfaces, whereas traditional clamping means have generally been limited to linear welds on flat surfaces.

The contact devices may allow, or limit, motion in any direction. The contact devices may take the form of casters, rollers, and ball bearings, among others. The location of the plurality of contact devices is significant in that external clamping is greatly reduced, and in many cases totally eliminated, as the contact devices are brought into close proximity to the area of the weld. Generally, the contact devices are separated from the tool sidewall by a clamping distance of less than the maximum width of the tool.

The apparatus may also include a shielding gas sled. Despite the fact that FSW is a solid-phase procedure, certain materials still require gas shielding during welding to produce welds of the highest quality. Therefore, the shielding gas sled acts to supply shielding gas to the weld area. The apparatus may also include virtually any motion control system. The motion control system may incorporate a multi-axis system such as those commonly used in modern automated manufacturing, allowing the apparatus to follow nonlinear welds on surfaces having complex curvature.

Numerous variations, modifications, alternatives, and alterations of the various preferred embodiments, processes, and methods may be used alone or in combination with one another as will become more readily apparent to those with skill in the art with reference to the following detailed description of the preferred embodiments and the accompanying figures and drawings.

BRIEF DESCRIPTION OF THE DRAWINGS

Without limiting the scope of the present invention as claimed below and referring now to the drawings and figures:

DETAILED DESCRIPTION OF THE INVENTION

The method and apparatus for locally clamping components that are to be joined by friction stir welding of the instant invention enables a significant advance in the state of the art. The preferred embodiments of the apparatus accomplish this by new and novel arrangements of elements and methods that are configured in unique and novel ways and which demonstrate previously unavailable but preferred and desirable capabilities. The description set forth below in connection with the drawings is intended merely as a description of the presently preferred embodiments of the invention, and is pot intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

Figure 1:
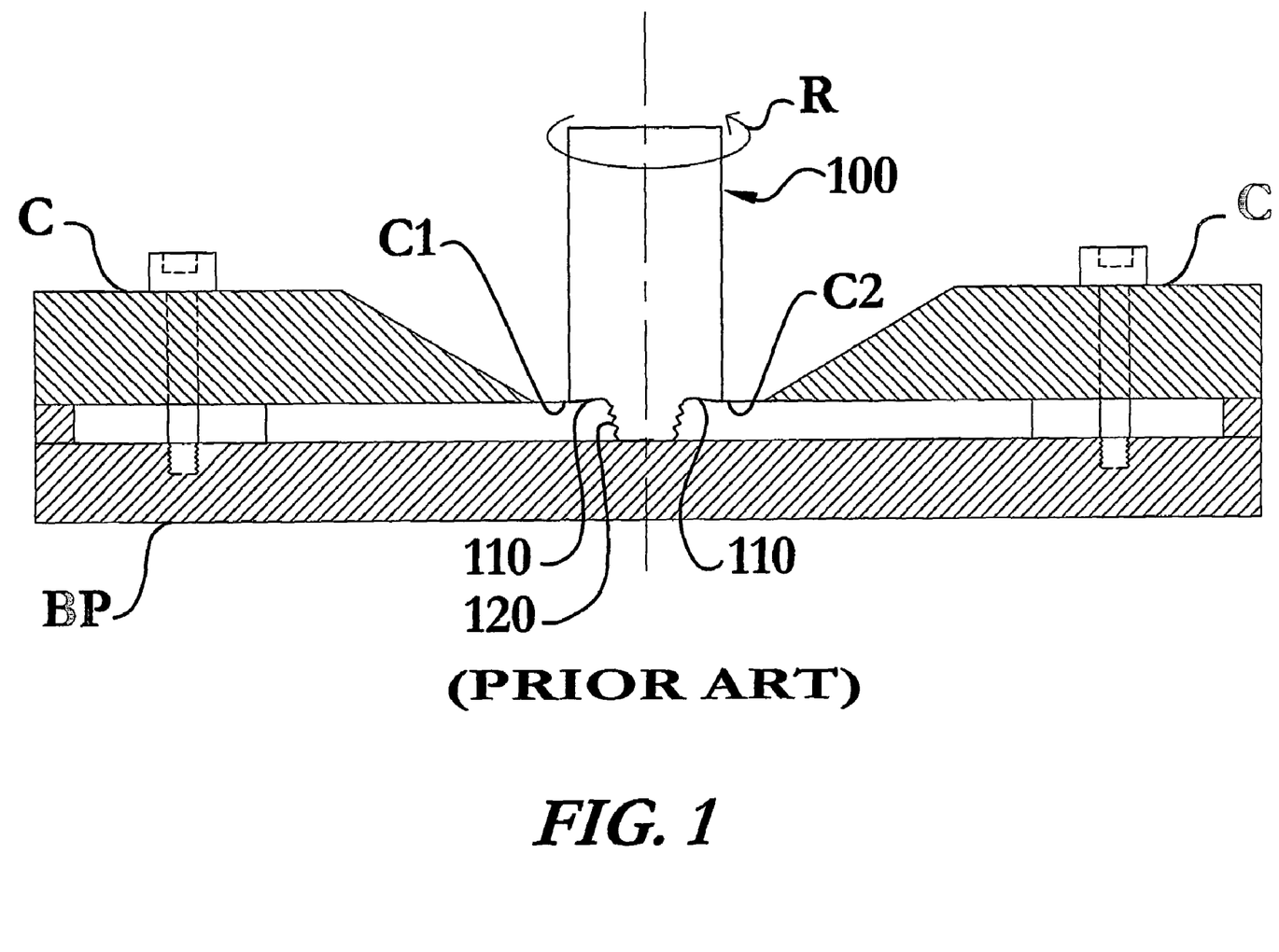
FIG. 1 shows a cross-sectional view, not to scale, of a conventional (prior art) FSW arrangement and the associated clamping required.
Figure 2:
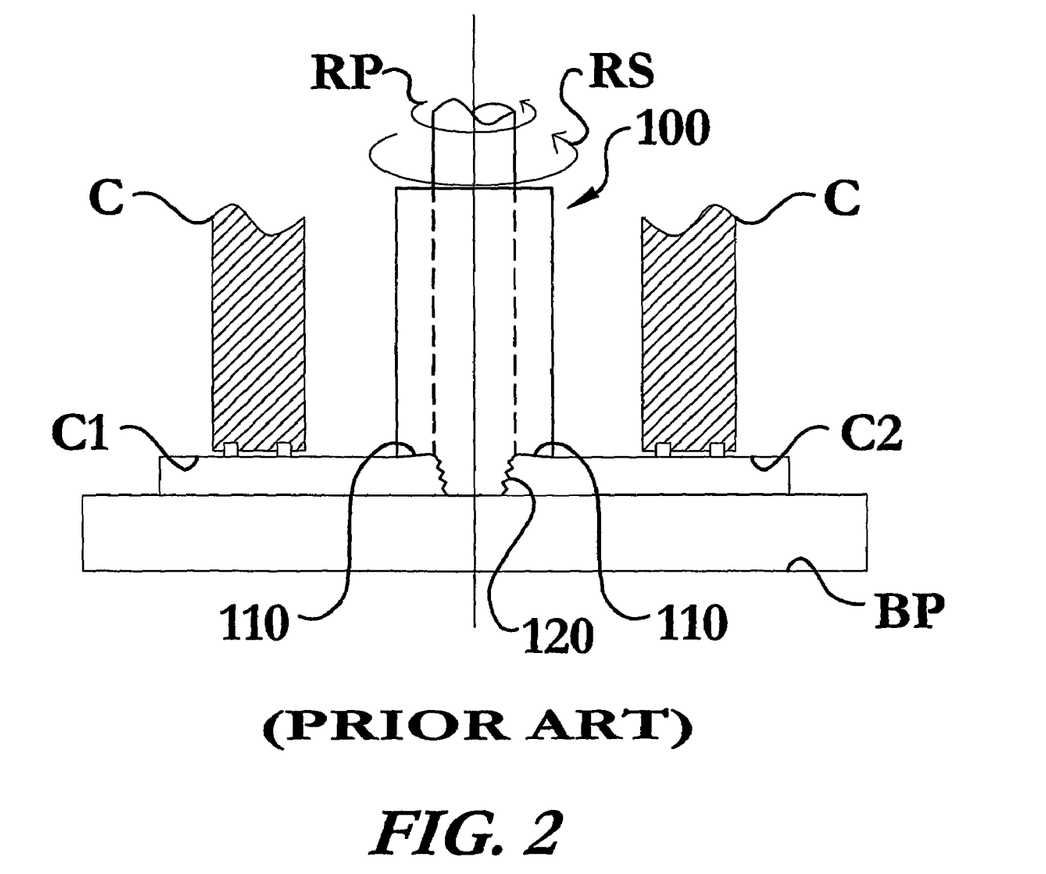
FIG. 2 shows a cross-sectional view, not to scale, of a conventional (prior art) FSW arrangement having a retractable pin tool with roller skate type clamping.

Traditional friction stir welding (FSW) single piece tool and retractable pin tool setups are illustrated in FIG. 1 and FIG. 2, respectively. Such conventional FSW setups are plagued by conventional clamping systems. The conventional clamping system C illustrated in FIG. 1 shows traditional clamps bolted to a backing plate (BP) to keep the first component (C1) from separating from the second component (C2) during welding. As one skilled in the art can appreciate, such conventional clamping means (C) are extremely cumbersome and time consuming to install in even the most basic flat plate and linear weld applications. Additionally, FIG. 2 illustrates another conventional clamping means (C), that of rollers used near the extremities of the workpieces (C1, C2). Such prior art rollers are known to be large and inconvenient even on the most simple welds. Additionally, although not shown in FIG. 2, such rollers are generally secured to the FSW tool (100) so as to limit the depth that a probe (120) may enter the workpieces (C1, C2). As such, the rollers are limited to being under the same compressive force that the tool (100) is subjected to.

Figure 3:
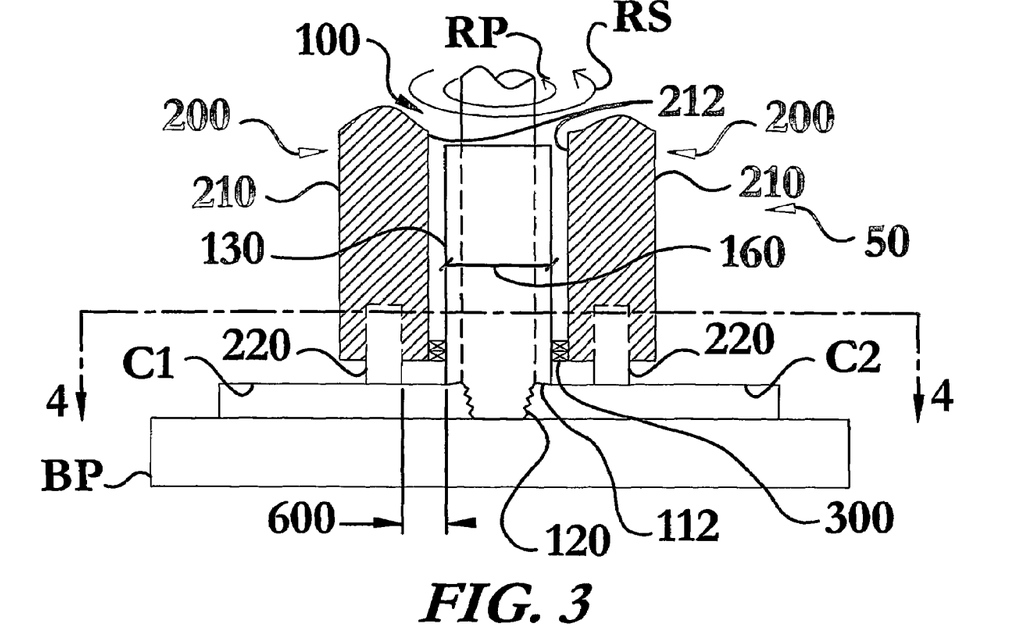
FIG. 3 shows a cross-sectional view, not to scale, of the present invention.
Figure 4:
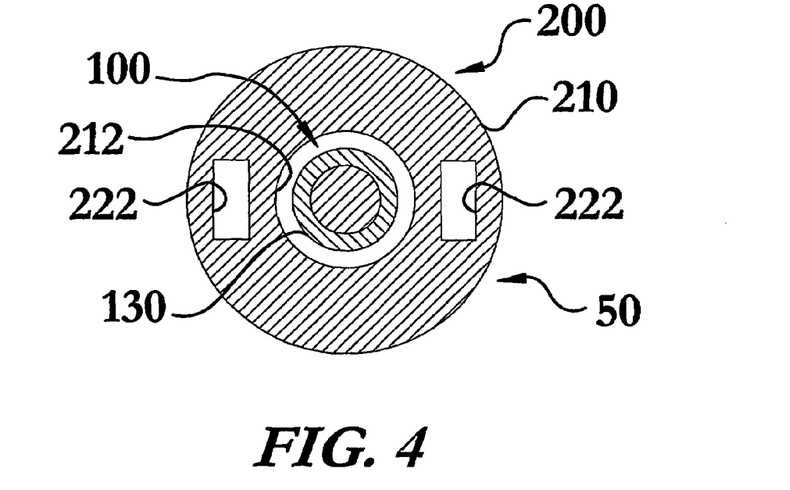
FIG. 4 shows a cross-sectional view, not to scale, of the present invention taken along line 4-4 in FIG. 3.
Figure 5:
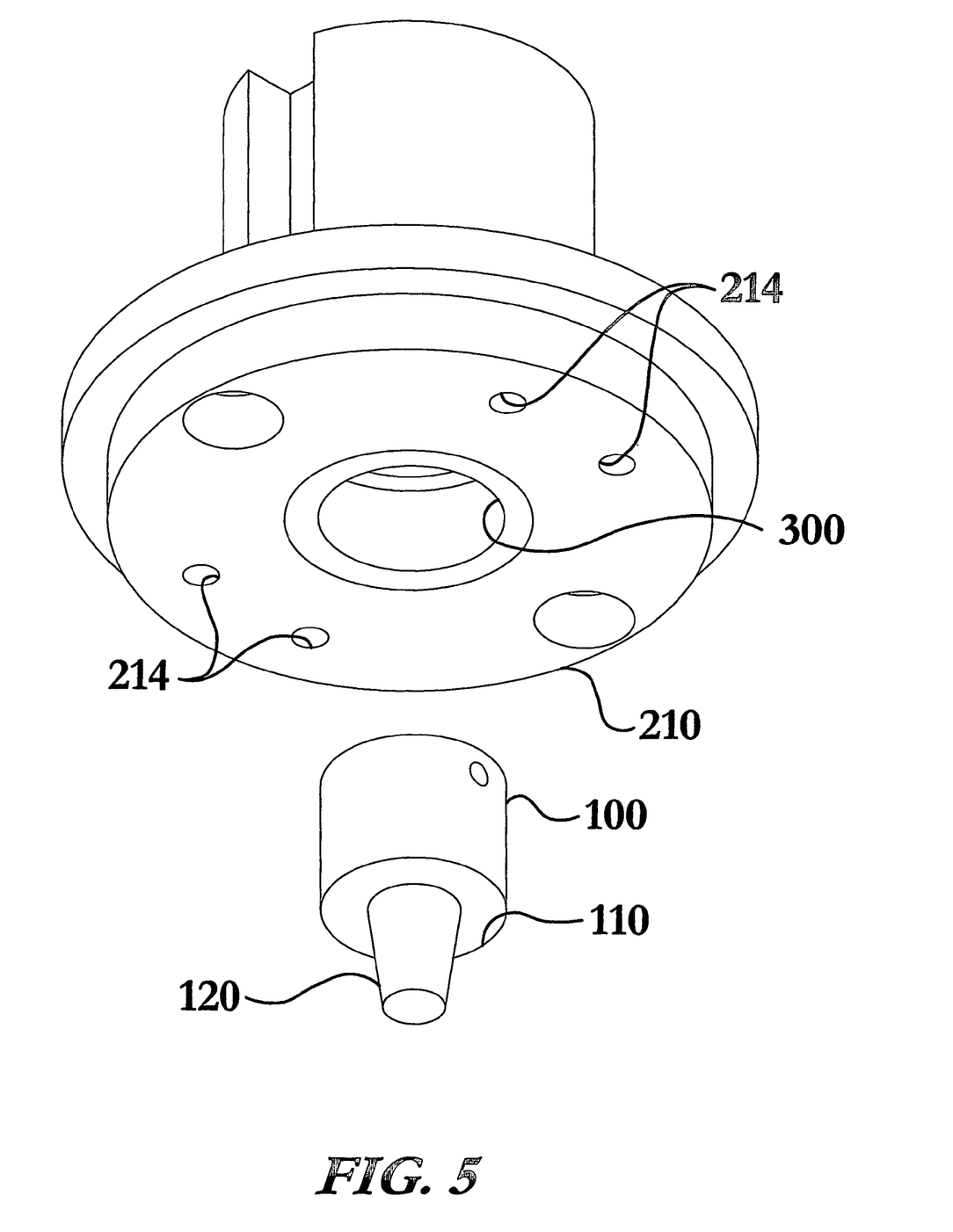
FIG. 5 shows an embodiment of the present invention in perspective view, not to scale.
Figure 6:
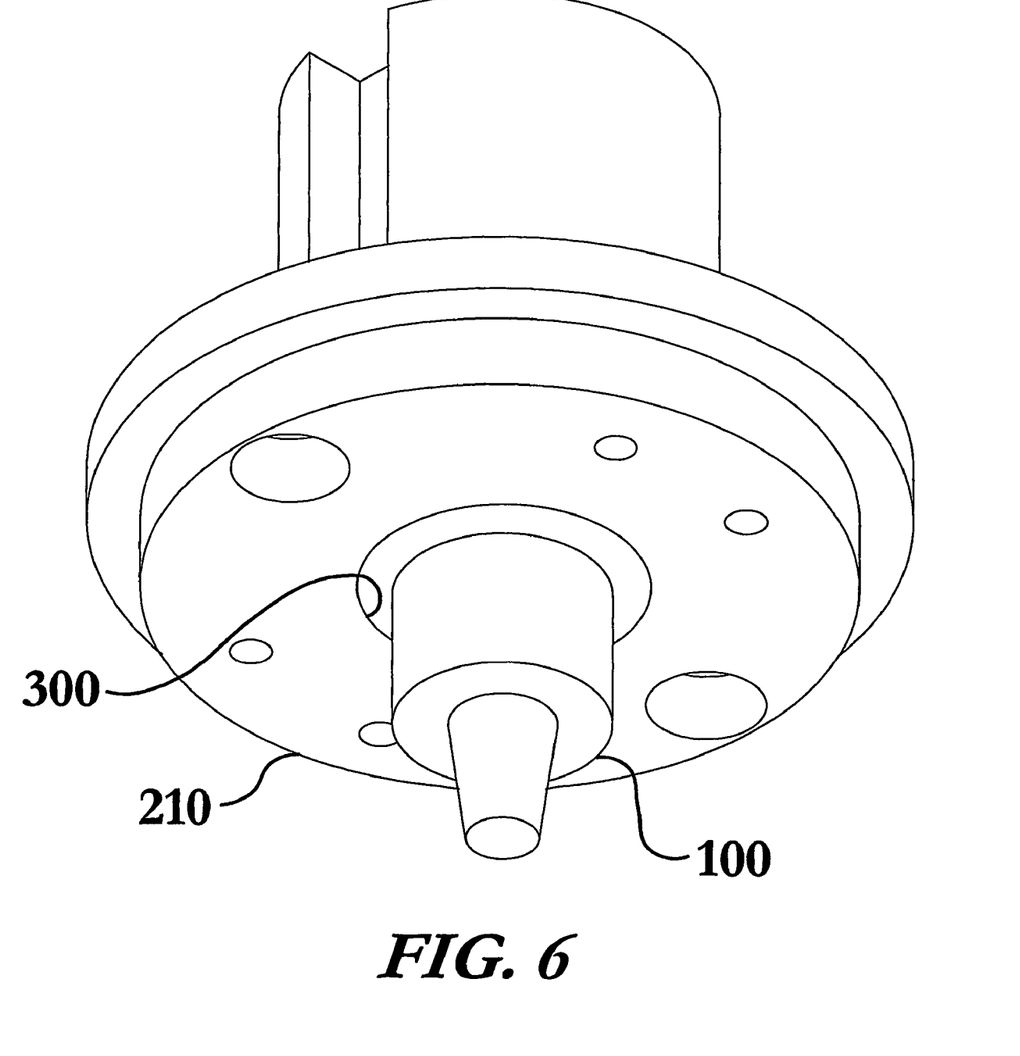
FIG. 6 shows the embodiment of FIG. 5 with the tool installed, in perspective view, not to scale.

In one embodiment, the present apparatus (50) is designed to locally clamp at least a first component (C1) and a second component (C2) during FSW wherein the components (C1, C2) are placed in close proximity to each other. In one embodiment, the components (C1, C2) are butted against each other along a common edge thereby forming a joint, as shown in FIG. 3 and FIG. 5. While FIG. 1 through FIG. 15 generally illustrate a butt joint configuration, the present invention is not limited to such configuration and may be used on T joints, corner joints, and lap joints, just to name a few.

The apparatus (50) includes a FSW tool (100), a local clamping means (200), and an interface (300) that joins the FSW tool (100) and the local clamping means (200). The FSW tool (100) is formed with at least one sidewall (130) and a probe (120) shown in FIGS. 1, 2, 3, and 5. The tool (100) may also have a shoulder (110) containing a contact surface (112). In such embodiments the probe (120) extends substantially perpendicular from the shoulder (110). The probe (120) may be exposed to many external forces in the production of a friction stir weld. The apparatus (50) of the present invention has overcome many prior art limitations and is compatible with virtually any motion control system currently in use. As such, the apparatus (50) can weld components having complex curves and nonlinear joints. Additionally, the shoulder (110) and the probe (120) may be formed as a single component or they may be individual components formed such that the probe (120) may retract into, and extend from, the shoulder (110). The contact surface (112) is generally formed to include a material retaining region (114), shown in FIG. 11, that acts to prevent plasticized material from escaping from the joint during welding. As such, the material retaining region (114) may accomplish this in a number of ways. In one embodiment, the material retaining region (114) is formed with a concave surface directed toward the workpieces. The material may also be retained by incorporating a scroll that directs plasticized material towards the probe (120).

Now focusing just on the FSW tool (100), a minimum of two nonrotational forces, regardless of the motion control system, are applied to the tool (100); a travel force and a compressive force. The travel force is simply the force, or forces, that route the tool (100) along the joint to be welded and force the tool (100) through the components (C1, C2). The compressive force is that force, or forces, exerted on the tool (100) to force the probe (120) into the components (C1, C2) and maintain the probe (120) in the components (C1, C2) during welding.

The local clamping means (200) is in close proximity to the at least one sidewall (130) of the tool (100) and has a housing (210) and a plurality of contact devices (220). The housing (210) may be in virtually any configuration imaginable. For instance, the housing (210) may totally bound the tool (110), or it may only be located in the area of a small portion of the tool (110). Additionally, the housing (210) may be composed of multiple sections, or it may be unitary. Regardless of configuration, the housing (210) will have at least one inner surface (212). The inner surface (212) may be in close proximity to the at least one sidewall (130) of the tool (100). The plurality of contact devices (220) transfer a clamping force to the first and the second components (C1, C2) to hold the components (C1, C2) firmly in place during FSW, thereby resisting the components (C1, C2) tendency to separate from one another as the tool (100) is forced between them. The apparatus (50) may include a load control system to independently and adaptively control and apply the compressive force and the clamping force, in addition to the travel force, or forces.

The interface (300) permits the compression force and the clamping force to be entirely independent, or one in the same. As such, the interface (300) releasably, rotably, and slidably joins the tool (100) and the local clamping means (200) such that the tool (100) and the local clamping means (200) may rotate, extend, and retract independently of each other. In one particular embodiment, shown in FIGS. 5-10, the interface (300) is a bushing that has been press fit into the housing (210) with an interference of approximately 0.001 inches. The interface (300) permits the apparatus (50) to be "steered" along complex nonlinear joints on complex surfaces, whereas traditional clamping means have generally been limited to linear welds on flat surfaces. The independence of the tool (100) and local clamping means (200) also allows these components to rotate at different speeds relative to each other, and even to rotate in different directions. The interface (300) may produce a gap between the at least one tool sidewall (130) and the housing inner surface (212). The gap may vary greatly depending on the type of interface (300) and the forces to which it is exposed. Further, the interface (300) is not limited to a single discrete device and may incorporate a number of individual elements working in conjunction.

Figure 7:
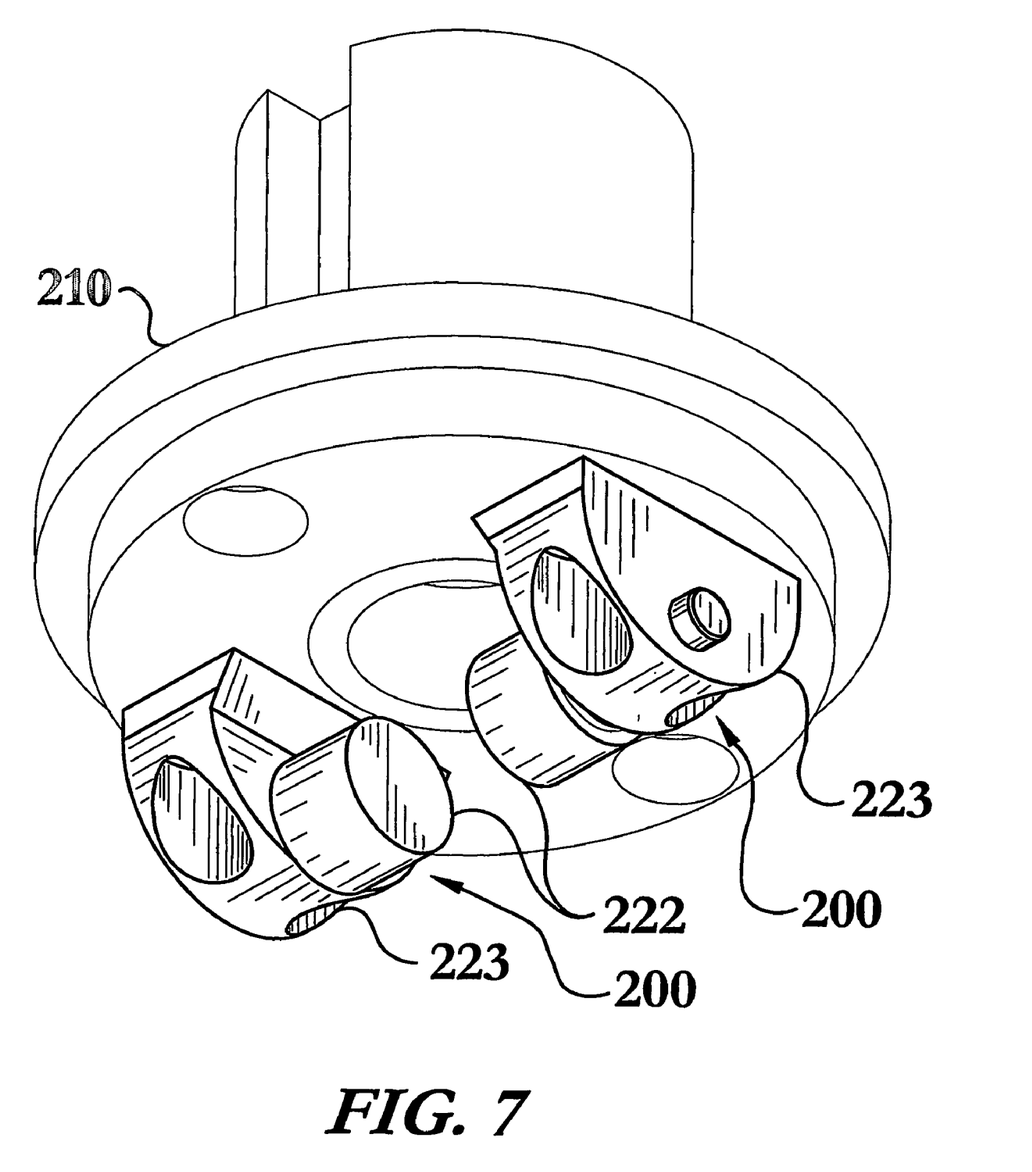
FIG. 7 shows the embodiment of FIG. 5 with the local clamping means installed, in perspective view, not to scale.
Figure 9:
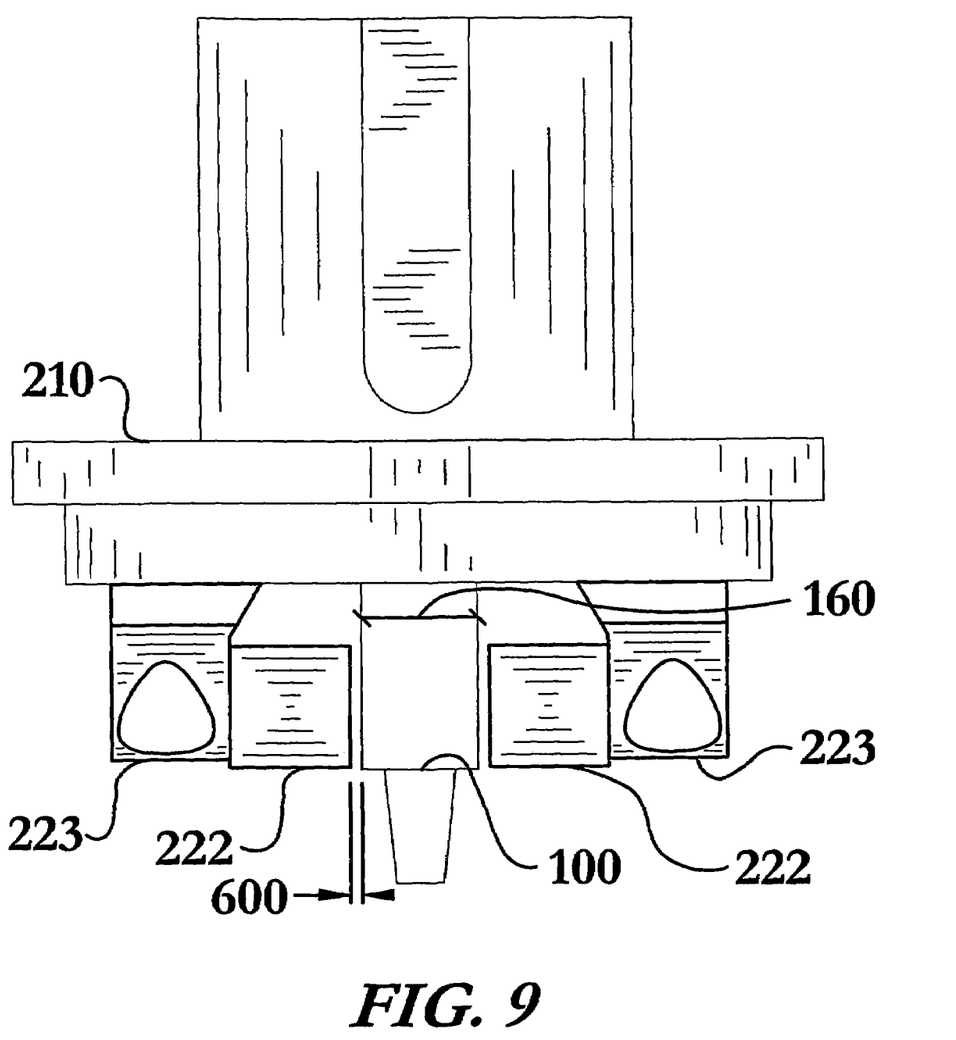
FIG. 9 shows a front elevation view of FIG. 8, not to scale.
Figure 11:
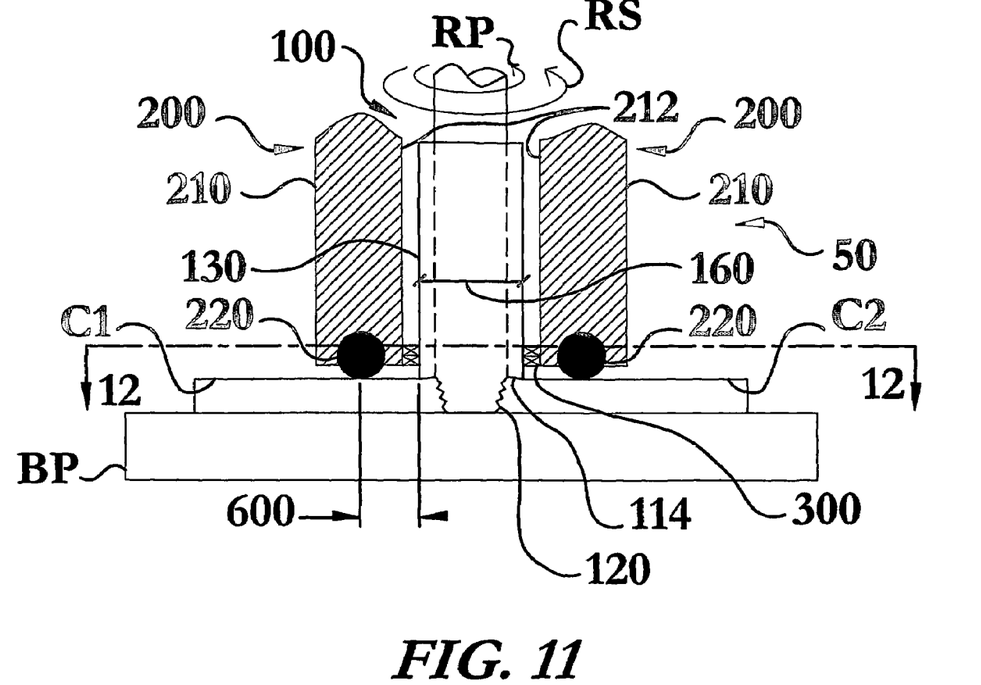
FIG. 11 shows an embodiment of the present invention in a cross-sectional view, not to scale.
Figure 12:
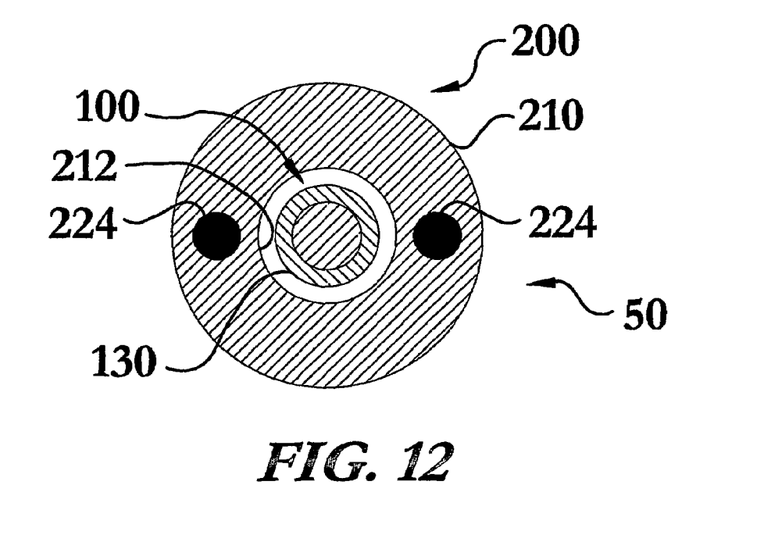
FIG. 12 shows a cross-sectional view, not to scale, of the present invention taken along line 12-12 in FIG. 11.

The plurality of contact devices (220) may allow, or limit, motion in any direction. The contact devices (220) may take the form of casters, rollers (222), and ball bearings (224), as shown in FIGS. 3, 7, and 11, among others. The location of the plurality of contact devices (220) is significant in that external clamping is greatly reduced, and in many cases totally eliminated, as the contact devices (220) are brought into close proximity to the area of the weld. Generally, the contact devices (220) are separated from the tool sidewall (130) by a clamping distance (600) of less than the maximum width (160) of the tool, as seen in FIGS. 3, 9, and 11. Further embodiments reduce the clamping distance (600) far beyond that thought possible. For example, in one such embodiment the clamping distance (600) is less than one-half of the maximum width of the tool (100). Yet an even more preferred embodiment reduces the clamping distance (600) to 0.060 inches, or less.

Figure 8:
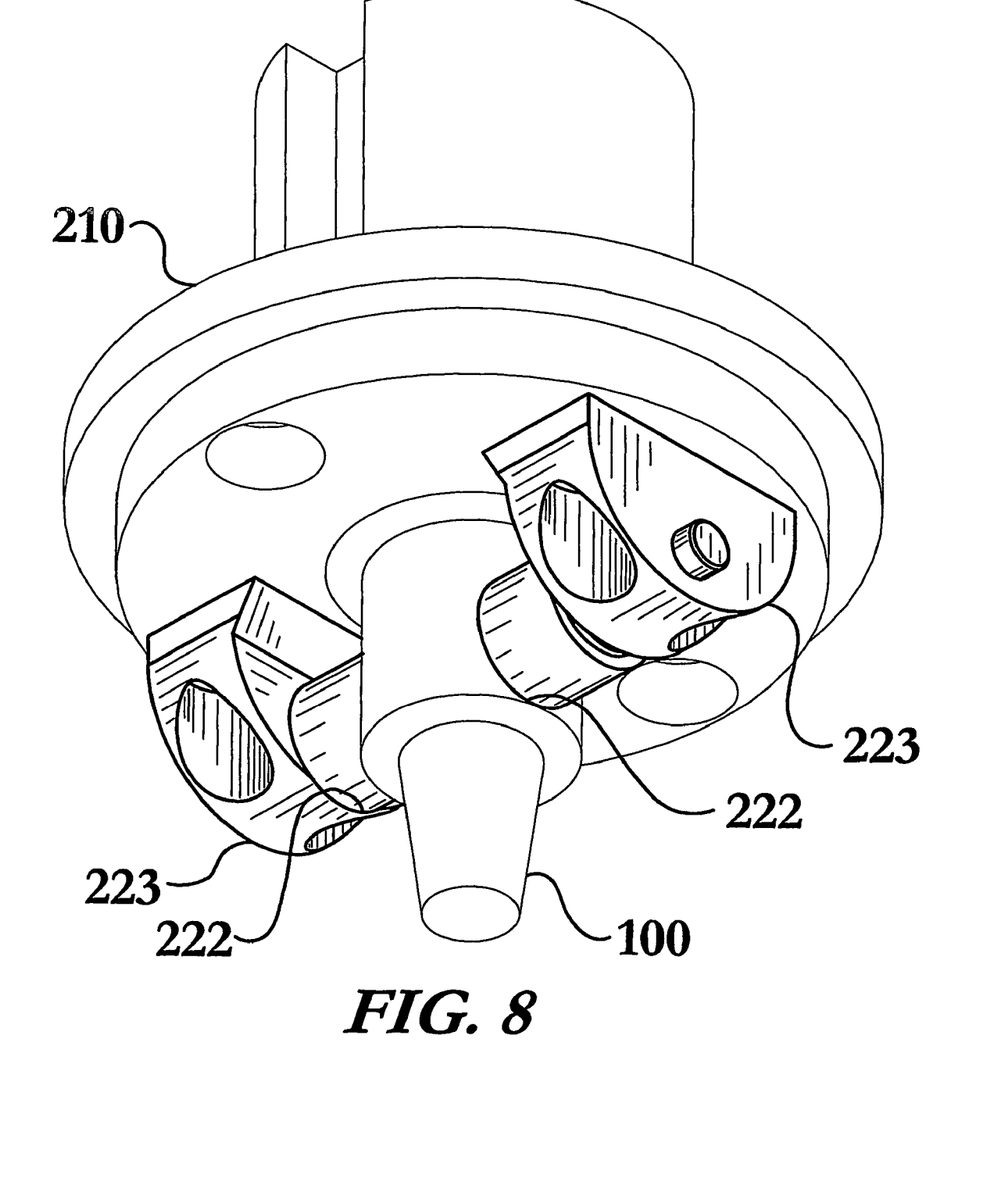
FIG. 8 shows the embodiment of FIG. 5 with the tool and the local clamping means installed, in perspective view, not to scale.
Figure 10:
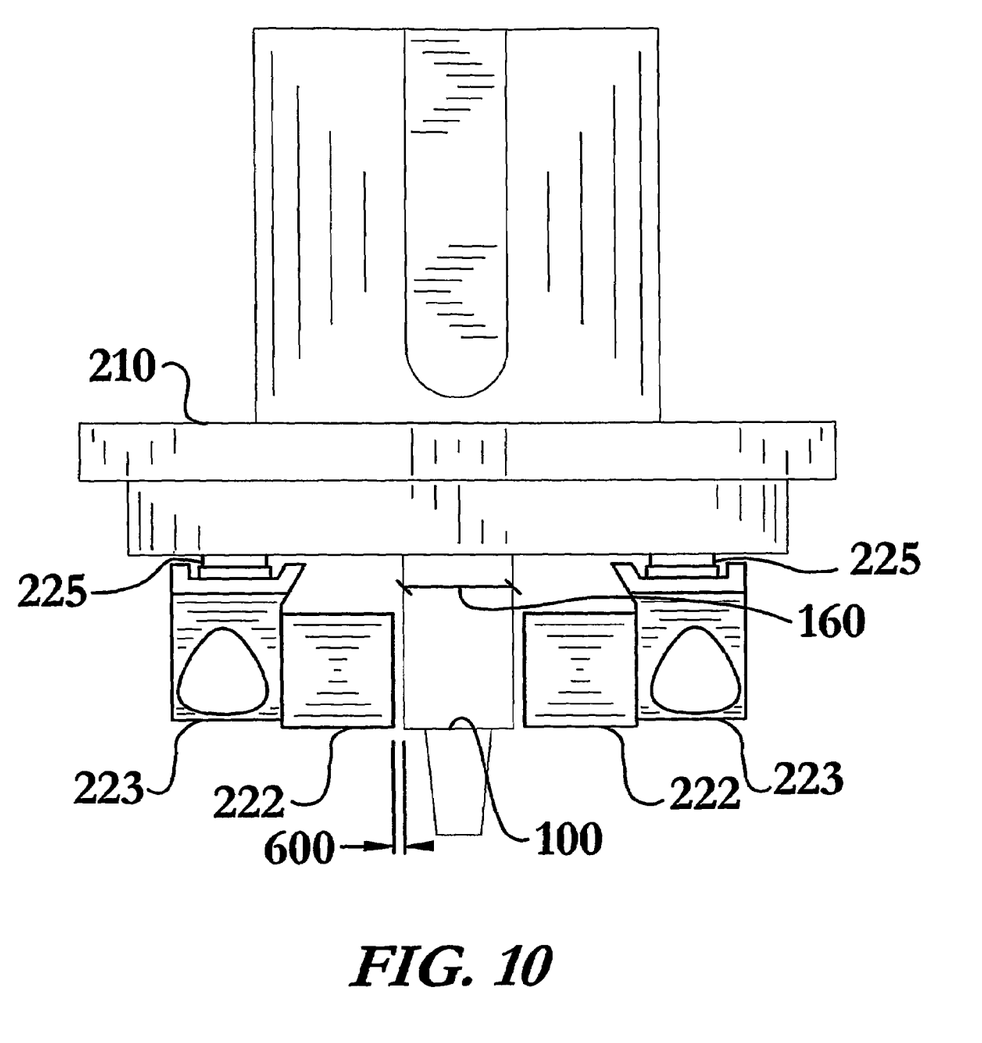
FIG. 10 shows an embodiment of the present invention in front elevation view, not to scale.

FIG. 5 illustrates an embodiment of the housing (210) without the local clamping means attached, and with the tool (100) removed from the housing (210). The tool (100) is shown inserted into the housing (210) in FIG. 6. One embodiment of the local clamping means (200) is shown attached to the housing (210) in FIG. 7. In this embodiment, the local clamping means (200) includes a roller (222) attached to a roller mount (223), which is secured to the housing (210) via a plurality of mounting recesses (214) formed in the housings (210). The housing (210) may include a number of mounting recesses (214) to facilitate adjustability of the location of the rollers (222). In fact, the mounting recesses (214) may be formed as a slot to further allow adjustability. FIG. 8 illustrates the embodiment of FIG. 7 with the tool (100) installed in the housing (100). FIG. 9 illustrates a front elevation view of the embodiment of FIG. 8 showing the clamping distance (600). Additionally, FIG. 10 illustrates a further embodiment of the local clamping means (200) whereby the rollers (222) are secured to the housing via a flexible mount (225) that allows the rollers to compensate for potentially uneven surfaces of components (C1, C2). The flexible mount (225) may incorporate any number of technologies to permit it to effectively transfer the clamping force while facilitating some flexibility in the roller (222) position and angle to accommodate changes in thickness of the components (C1, C2). Such technologies may include simple high-strength springs or more advanced hydraulic systems, just to name a few.

The contact devices (220) may be configured in any number of ways, as previously illustrated by roller (222) embodiments and bearing (224) embodiments. Additionally, the contact devices may include any number of grip enhancing surface textures and coatings. Such grip enhancing features may even further reduce the clamping force that is required to maintain the position of the components (C1, C2).

Figure 16:
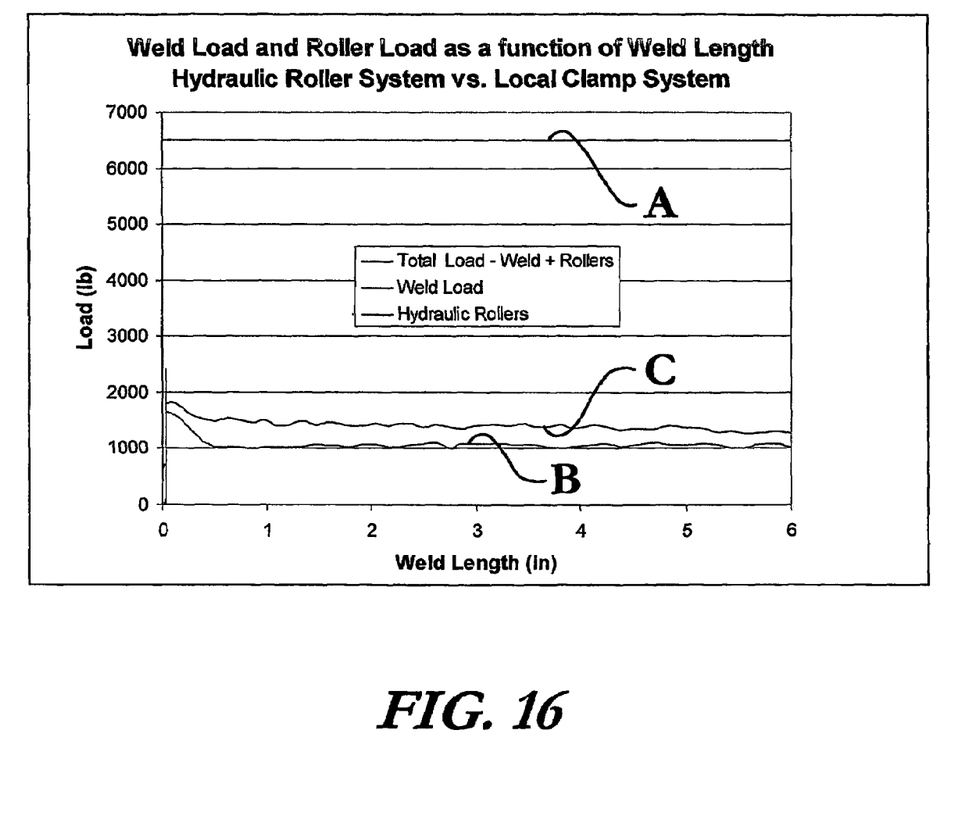
FIG. 16 shows a graph of the local required when utilizing conventional clamping systems and the load required when utilizing the clamping systems of the present invention.

The graph in FIG. 16 illustrates the comparative advantage of using the present local clamping method and apparatus versus conventional clamping systems. The graph illustrates the results of two experimental friction stir welds performed in identical components. First, the load line labeled A illustrates that approximately 6,500 pounds of clamping force per roller that was required to securely hold the first and second components in place during friction stir welding using traditional clamping systems. Alternatively, an identical weld produced using the present invention only required a clamping force of approximately 150 pounds per roller. The 150 pound load is arrived at by subtracting the weld load, line B, from the total load required to secure the components, line C, and dividing by 2, which is the number of rollers used in the experiment. By reducing the clamping distance to approximately 0.060 inches, or less, the clamping force required to maintain the position of the components has been reduced from 6,500 pounds per roller to 150 pounds per roller. Yet another benefit of using the apparatus (50) is that the dramatic reduction in the required clamping force reduces the likelihood of the rollers cosmetically effecting the components and permits use with softer materials.

Figure 13:
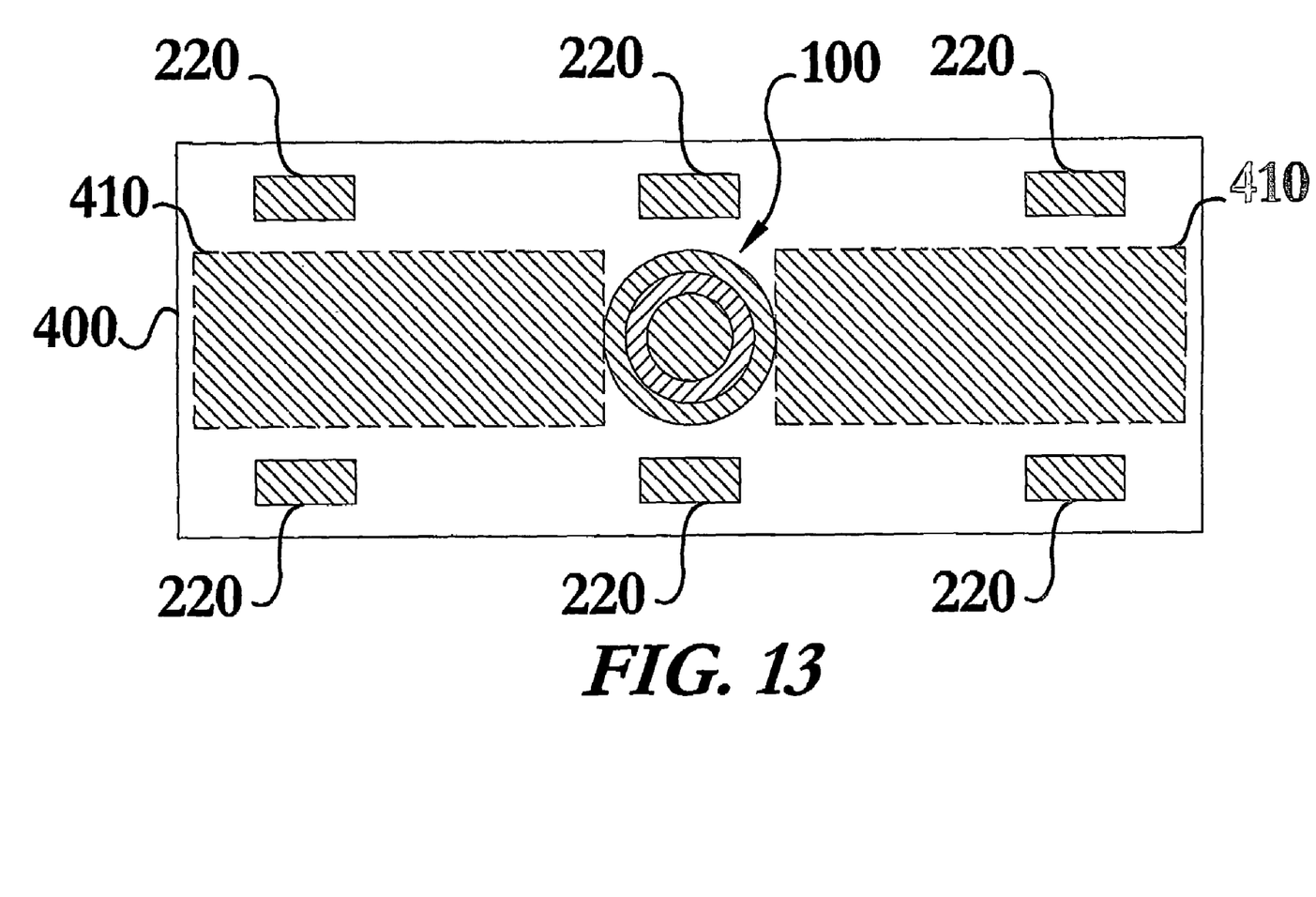
FIG. 13 shows a top cross-sectional view, not to scale, of a variation of the embodiment shown in FIG. 3.

In yet another improved embodiment shown in FIG. 13, the apparatus (50) may include a shielding gas sled (400) formed in, or attached to, the housing (210). Despite the fact that FSW is a solid-phase procedure, certain materials still require gas shielding during welding to produce welds of the highest quality. Therefore, the shielding gas sled (400) acts to supply shielding gas to the weld area through at least one distribution means (410). The shielding gas sled (400) is in fluid communication with a shielding gas source. The fluid communication may be from a connection port located on the shielding gas sled (400), or fluid communication may be established through passageways in the tool (100) and/or local clamping means (200).

Figure 14:
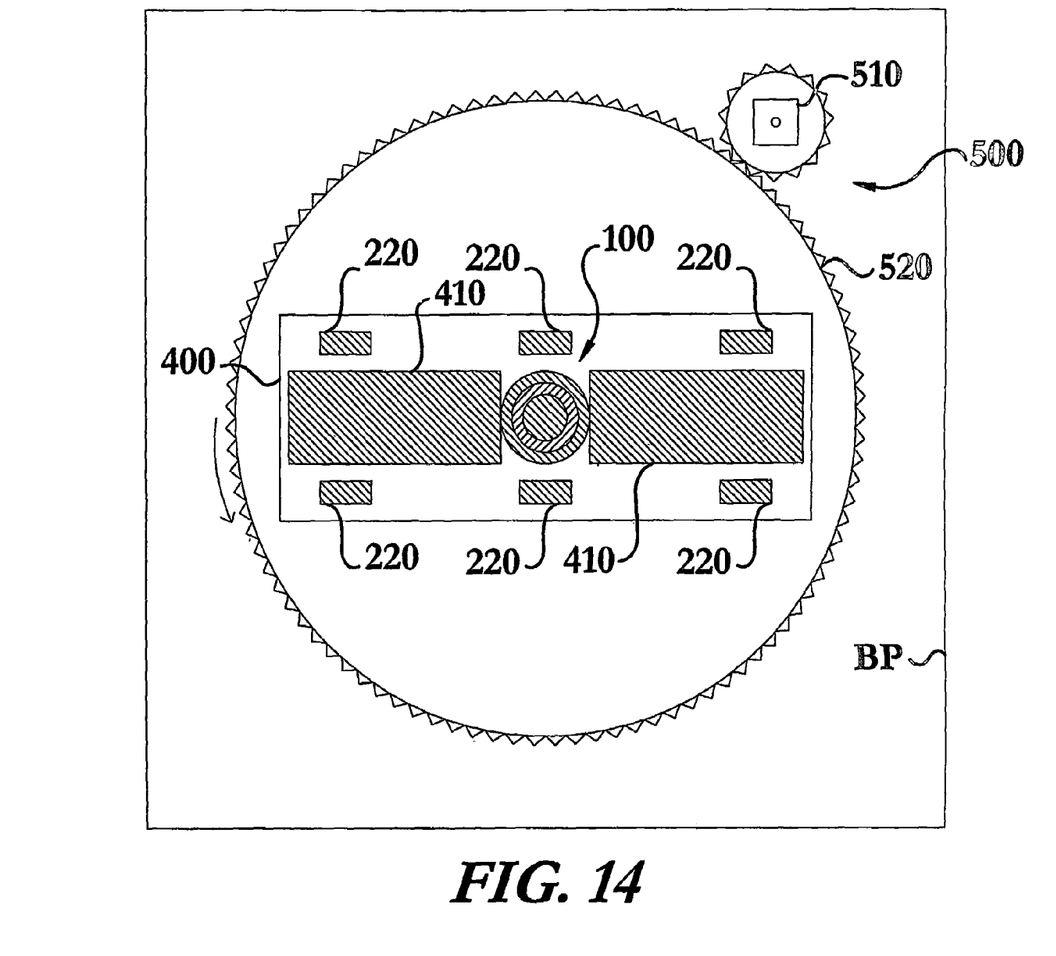
FIG. 14 shows a top cross-sectional view, not to scale, of a variation of the embodiment shown in FIG. 3 and one embodiment of a motion control system.
Figure 15:
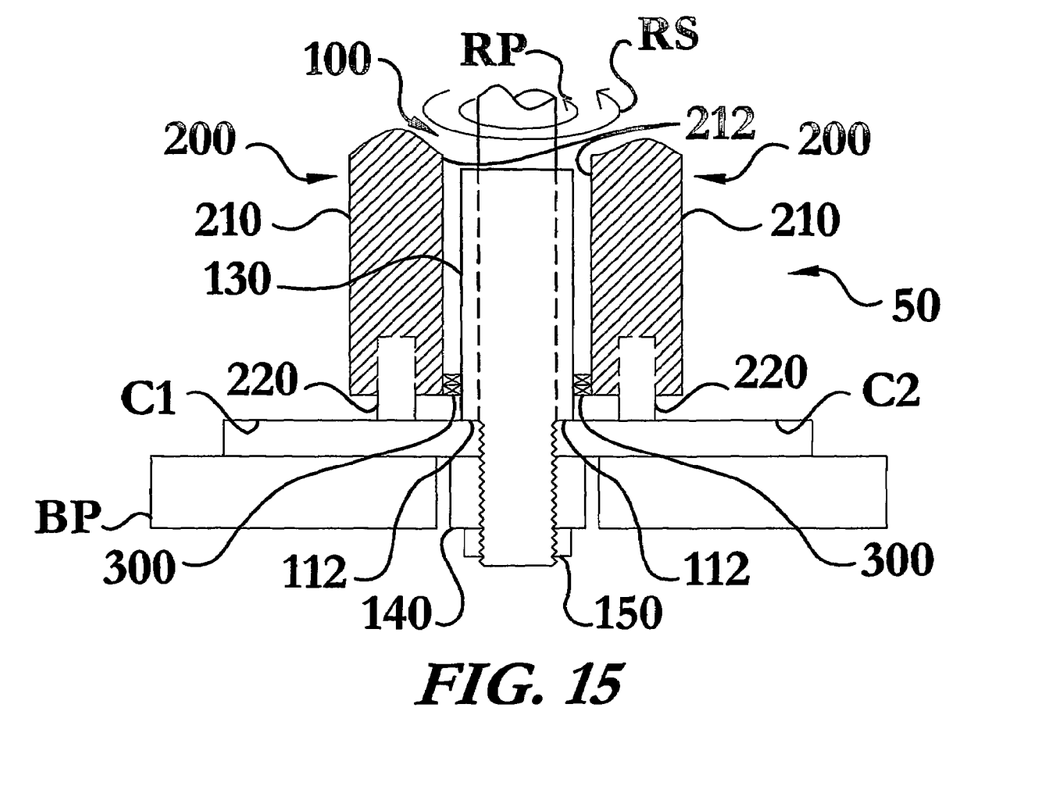
FIG. 15 shows a variation of the present invention in a cross-sectional view, not to scale.

The apparatus (50) may include virtually any motion control system (500). The motion control system (500) may incorporate a multi-axis system such as those commonly used in modern automated manufacturing, allowing the apparatus (50) to follow nonlinear welds on surfaces having complex curvature. In just one embodiment, shown in FIG. 14, the motion control system (500) may include a motor (510) and an independent rotary shaft (520). A similar setup may be used to control the motion in the plane orthogonal to that shown in FIG. 14. The apparatus (50) thereby permits the orientation of the contact devices (220) independently of the direction of travel of the tool (100). This configuration permits the housing (210), and therefore the contact devices (220), to be steered and accommodate complex weld paths. While the motion control system (500) of FIG. 14 is illustrated with the shielding gas sled (400) embodiment, one with skill in the art will appreciate that it may be equally effectively applied to any embodiment herein.

The apparatus (50) may be configured for use in a bobbin tool arrangement, as shown in FIG. 9. In this embodiment, the apparatus (50) includes at least one bobbin (140) and retainer nut (150) to releasably cooperate with the probe (120) on the opposite side of the workpieces (C1, C2) from the local clamping means (200).

The apparatus (50) may further include a computer controlled seam tracking system and/or advanced load control systems for ensuring accurate positioning of the apparatus (50) and to independently and adaptively control and apply the compressive force and the clamping force, in addition to the travel force, or forces. The motion control system (500) may also permit the apparatus (50) to be operated in a manner to compensate for variations in part fit-up and thickness. This may be accomplished through the use of at least one independent force controlled device to adaptively change the clamping load as needed.

While the disclosure herein refers generally to a first workpiece (C1) and a second workpiece (C2), the apparatus (50) may be used in joining more than just two workpieces. Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims. The corresponding structures, materials, acts, and equivalents of all means or step plus function elements in the claims below are intended to include any structure, material, or acts for performing the functions in combination with other claimed elements as specifically claimed.

We claim:

1. An apparatus for locally clamping at least a first component (C1) and a second component (C2) during friction stir welding wherein the components (C1, C2) are placed in close proximity to one another, comprising:

a friction stir welding tool (100) formed with at least one sidewall (130) and having a probe (120) exposed to a controlled compressive force thereby forcing the probe (120) into the first component (C1) and the second component (C2) during friction stir welding;

a local clamping means (200) having a housing (210) and a plurality of contact devices (220) located to transfer a clamping force to the first (C1) and the second (C2) components in the immediate vicinity of the tool (100) to hold the components (C1, C2) firmly in place during friction stir welding, the contact devices (220) separated from the sidewall (130) by a clamping distance (600) of less than the maximum width (160) of the tool (100); and an interface (300) that at least during welding releasably, rotably, and slidably join the tool (100) and the local clamping means (200) such that the tool (100) and the local clamping means (200) may rotate about an axis of rotation parallel to an axis of rotation of the tool (100), and extend, and retract independently of each other.

2. The apparatus of claim 1, wherein the clamping distance (600) is less than one-half of the maximum width (160) of the tool (100).

3. The apparatus of claim 1, wherein the clamping distance (600) is less than 0.060 inches.

4. The apparatus of claim 1, wherein the plurality of contact devices (220) are rollers (222).

5. The apparatus of claim 4, wherein the compressive force and the clamping force are independent of each other.

6. The apparatus of claim 4, further including a shielding gas sled (400), in fluid communication with a shielding gas source, formed in the housing (210) whereby at least one distribution means (410) shields at least a portion of the first component (C1) and/or the second component (C2) with shielding gas.

7. The apparatus of claim 4, further including a bobbin (140) and a retaining nut (150) for releasably receiving the probe (120), wherein the probe (120) extends through the first (C1) and second (C2) components as well as the bobbin (140) and at least a portion of the retaining nut (150).

8. An apparatus for locally clamping at least a first component (C1) and a second component (C2) during friction stir welding wherein the components (C1, C2) are placed in close proximity to one another, comprising:

a friction stir welding tool (100) formed with at least one sidewall (130) and having a probe (120) exposed to a controlled compressive force thereby forcing the probe (120) into the first component (C1) and the second component (C2) during friction stir welding;

a local clamping means having a housing (210) and a plurality of rollers (222) located to transfer a clamping force to the first (C1) and the second (C2) components in the immediate vicinity of the tool (100) to hold the components (C1, C2) firmly in place during friction stir welding, the rollers (222) separated from the sidewall (130) by a clamping distance (600) of less than one-half the maximum width (160) of the tool (100); and an interface (300) that at least during welding releasably, rotably, and slidably join the tool (100) and the local clamping means (200) such that the tool (100) and the local clamping (200) means may rotate about an axis of rotation parallel to an axis of rotation of the tool (100), and extend, and retract independently of each other.

9. The apparatus of claim 8, wherein the clamping distance (600) is less than 0.060 inches.

10. The apparatus of claim 8, wherein the compressive force and the clamping force are independent of each other.

11. The apparatus of claim 8, further including a shielding gas sled (400), in fluid communication with a shielding gas source, formed in the housing (210) whereby at least one distribution means (410) shields at least a portion of the first component (C1) and/or the second component (C2) with shielding gas.

12. The apparatus of claim 8, further including a bobbin (140) and a retaining nut (150) for releasably receiving the probe (120), wherein the probe (120) extends through the first (C1) and second (C2) components as well as the bobbin (140) and at least a portion of the retaining nut (150).

\* \* \* \* \*